United States Patent [19]  
Coppola et al.

[11] Patent Number: 4,880,453  
[45] Date of Patent: Nov. 14, 1989

[54] METHOD FOR MAKING GLASS ARTICLES WITH DEFECT-FREE SURFACES AND SOLUBLE GLASSES THEREFOR

[75] Inventors: Frank Coppola, Big Flats; William H. Dumbaugh, Jr., Painted Post; William P. Ryszytiwskyj, Corning, all of N.Y.

[73] Assignee: Corning Incorporated, Corning, N.Y.

[21] Appl. No.: 286,642

[22] Filed: Dec. 19, 1988

[51] Int. Cl.$^4$ .............................................. C03C 19/00
[52] U.S. Cl. ............................................. 65/23; 65/31; 156/657; 156/663; 501/75; 501/78
[58] Field of Search .................. 65/23, 31; 156/657, 156/663; 501/75, 78

[56] References Cited

U.S. PATENT DOCUMENTS

| | | | |
|---|---|---|---|
| 3,771,983 | 11/1973 | Straka | 65/31 |
| 3,899,314 | 8/1975 | Siegmund | 65/23 |
| 3,926,601 | 12/1975 | Hicks | 65/31 |
| 3,989,495 | 11/1976 | Siegmund | 65/31 |
| 4,011,071 | 3/1977 | Siegmund | 65/31 |
| 4,071,343 | 1/1978 | Siegmund | 65/23 |
| 4,102,664 | 7/1978 | Dumbaugh | 65/23 |

*Primary Examiner*—Robert L. Lindsay  
*Attorney, Agent, or Firm*—Clinton S. Janes, Jr.

[57] ABSTRACT

This invention is directed to a method for making a soda lime glass article having at least one surface which is essentially defect free and having a smoothness at least equivalent to that of a polished surface. The method generally comprises the steps of:

(a) bringing together a body of a soda lime glass and a body of a glass consisting essentially, by weight, of 0.75–7.5% $Li_2O$ and/or 18–27% $PbO$, the total $Li_2O + PbO$ not exceeding 32%, 35–50% $BaO$, 0–5% $Al_2O_3$, 30–50% $B_2O_3$, and 5–10% $SiO_2$, said glass having a softening point between 575°–650° C., a coefficient of thermal expansion compatible with soda lime glass, and being at least 100 times more soluble in a particular solvent that soda lime glass, at a temperature wherein at least said more soluble glass is in fluid form to produce a laminate having an interface between the glass bodies which is essentially defect free;

(b) cooling said laminate; and thereafter (c) contacting the laminate with an acid solution to dissolve away said more soluble glass.

10 Claims, No Drawings

METHOD FOR MAKING GLASS ARTICLES WITH DEFECT-FREE SURFACES AND SOLUBLE GLASSES THEREFOR

BACKGROUND OF THE INVENTION

U.S. Pat. No. 4,102,664 provides the basic disclosure of a method for making glass articles exhibiting defect-free surfaces which can be equivalent in smoothness to that produced through a polishing operation. As is explained therein, the method comprises five general steps:

(1) two glass forming batches of different compositions are melted, one batch for a glass which is highly soluble in a given solvent and the second batch for a glass which is relatively insoluble in the same solvent;

(2) these molten batches are simultaneously brought together while in the fluid state, i.e., at viscosities no higher than $2.5 \times 10^5$ poises, to form a laminated glass body wherein the insoluble glass is covered by the soluble glass;

(3) the glass layers are fused together at a temperature where they are sufficiently fluid to provide an interface therebetween which is defect free;

(4) the laminated article is cooled; and thereafter (5) the soluble glass layer is dissolved away in an appropriate solvent.

As is apparent from the above description, the basic concept of the process involved forming a glass body of a desired geometry having a main or core glass portion substantially enveloped within a skin of a second glass, this second glass having a composition exhibiting high solubility in a particular liquid. Hence, the core body is not exposed to any environmental abuse during the initial forming operation, during any subsequent forming operation, or during the cooling operation. Accordingly, it is protected from the occurrence of mechanical and/or chemical surface flaws inherently produced in glass forming processes. Consequently, an essentially pristine, defectfree surface on the core glass portion results when the skin glass is dissolved away.

The most basic requirement underlying the efficacy of the patented method is the presence of two glass compositions exhibiting very different solubilities in a particular solvent. As observed there, the skin glass will be at least ten times more soluble than the core glass, and preferably greater than 100 times more soluble. Whereas the disclosure of the patent posited the operability of forming a body glass demonstrating high resistance to attack by bases and a skin glass highly soluble in alkaline solutions, and the operability of forming a core glass exhibiting high resistance to attack by hydrofluoric acid and a skin glass highly soluble in hydrofluoric acid, the most practical combination of glasses was deemed to contemplate a body glass designed for resistance to water and/or dilute acids and a skin glass highly soluble therein.

The patent disclosed three glasses illustrative of suitable body glasses: the first had a composition generally within the alkali metal, alkaline earth metal (predominantly Sr) silicate system; the second was composed generally of alkali metal aluminosilicate; and the third consisted principally of alkali metal zinc silicate. As illustrative of operable skin glasses, the patent referred to glasses having compositions in the following systems: alkali metal silicates; various metaphosphate-type compositions; barium borosilicates; and various borate-based compositions. In a preferred embodiment the body and skin glass compositions were so selected that an exchange of ions occurred between the two when brought into contact with each other and/or when the laminated body was subsequently heat treated, that exchange enhancing the solubility of the skin glass and/or increasing the mechanical strength of the core glass. As illustrations of that phenomenon the patent noted the possible exchange of $Ca^{+2}$ ions from the skin glass with $Na^+$ ions from the body glass, the presence of the $Na^+$ ions rendering the skin glass more soluble, and the possible exchange of $Li^+$ ions from the skin glass with $Na^+$ and/or $K^+$ ions from the body glass, the presence of the $Li^+$ ions leading to the formation of a surface layer on the body glass having a lower coefficient of thermal expansion than the original body glass composition.

With respect to processing parameters for forming the laminated precursor glass article, the disclosure of the patent specified the following three requirements:

(a) the coefficient of thermal expansion of the skin glass from room temperature to the set point thereof should not exceed that of the core glass; preferably it will be somewhat lower;

(b) the viscosity of the skin glass will be equal to or somewhat lower than that of the body glass; and (c) the liquidus temperatures of both the skin and core glasses will most preferably be below the lamination temperature in order to avoid the occurrence of devitrification.

The patent expressly illustrates one forming process, viz., downdrawing in pairs two streams of glasses of different compositions to form cane having a core portion enveloped within a skin. However, the patent notes that shaping of laminated articles can be performed in any conventional glass forming practice, specifically mentioning pressing, vacuum forming, and press-and-blow.

As is well recognized in the art, soda lime glass is utilized in the fabrication of containers and window glass and, as such, comprises by far the greatest tonnage of glass melted. The compositions of commercial soda lime glasses vary somewhat over relatively narrow ranges of individual components, such variations frequently depending upon the batch materials employed. A typical analysis of sheet glass manufactured through the float glass process is reported below in weight percent, along with several physical properties measured thereon and the predominant crystal phase developed therein upon devitrification thereof.

| | | | |
|---|---|---|---|
| $SiO_2$ | 73.33 | MgO | 3.91 |
| $Na_2O$ | 13.69 | $Al_2O_3$ | 0.11 |
| $K_2O$ | 0.03 | $SO_3$ | 0.15 |
| CaO | 8.79 | $Fe_2O_3$ | 0.087 |
| Softening Point ($10^{7.6}$ poises) | | | 727° C. |
| Annealing Point ($\approx 10^{13}$ poises) | | | 543° C. |
| Strain Point ($\approx 10^{14.5}$ poises) | | | 504° C. |
| Density | | | 2.494 g/cm$^3$ |
| Coefficient of Thermal Expansion (25°-300° C.) | | | $86.2 \times 10^{-7}$/°C. |
| Coefficient of Thermal Expansion (25°-450° C.) | | | $89.6 \times 10^{-7}$/°C. |
| Liquidus Temperature | | | 992° C. |
| Crystal Phase | | | Wollastonite |

None of the composition systems of skin or cladding glasses disclosed in U.S. Pat. No. 4,102,664 appeared to be useful for combination with soda lime glasses to develop defect-free surfaces thereon. Accordingly, the primary objective of the present invention was to devise glass compositions suitable for cladding articles prepared from soda lime glass to protect the surface thereof as it is being formed into a desired shape, but which are more readily soluble in a particular solvent than soda lime glass, such as to be easily removable from the soda lime body shape. A second objective was to devise an improved method for forming laminated articles consisting of soda lime body glass and a soluble skin glass.

SUMMARY OF THE INVENTION

We have determined that those objectives can be secured through the use of skin or cladding glasses having compositions within very narrowly-defined areas. The key requirements for the cladding glasses are set out below:

(1) A coefficient of thermal expansion compatible with that exhibited by soda lime glass, preferably between about $75-95\times10^{-7}/°C$. over the range of 25°-300° C.;

(2) A solubility in a particular solvent at least 100 and, preferably, more than 1000 times greater than that of soda lime glass;

(3) A sufficient stability such that it does not devitrify during the forming process;

(4) Will preferably contain constituents which do not react significantly with the body glass. Hence, any reaction which may take place between the skin glass and the soda lime body glass must not deleteriously affect the soda lime glass or adversely affect the smoothness of the body glass surface when the skin glass is removed; and (5) A viscosity rendering it sufficiently fluid at forming temperatures to act as a "cushion" when brought into contact with a shaping means, thereby preventing the transfer of defects to the surface of the body glass, but not so fluid that it flows uncontrollably. We have determined empirically that forming of the body/skin composite articles can be conducted satisfactorily at skin glass viscosities varying over the region of about $10^4-10^8$ poises, depending upon the forming process employed, with a viscosity of about $10^7$ poises being deemed quite advantageous. In view of that finding we have ascertained that the softening point of the cladding glass constitutes a good reference property. Hence, our experimentation has indicated that the softening point of the skin glass should preferably range about 575°-650° C. We have also determined empirically that the viscosity of the cladding glass will most preferably be at least ten times less than that of the base glass at the forming temperature.

As was observed above, none of the glasses tabulated in U.S. Pat. No. 4,102,664 appeared to exhibit the proper combination of melting and forming properties to be applicable as a skin glass with soda lime glasses. Thus, it was generally found that, when the viscosities of the disclosed glasses were satisfactory for forming with soda lime body glasses, the coefficients of thermal expansion were generally too low. Hence, it was found generally impossible to approximate the thermal expansion of soda lime glass, while concurrently providing a glass demonstrating a viscosity suitable for forming.

We have determined that glasses having compositions within a narrow regime of the $Li_2O$ and/or $PbO-BaO-Al_2O_3-B_2O_3-SiO_2$ system fully comply with the five key requirements for cladding or skin glasses. That is, the glasses exhibit:

(a) coefficients of thermal expansion (25°-300° C.) compatible with soda lime glass;

(b) solubilities in particular solvents at least 100 times and, preferably, more than 1000 times greater than that demonstrated by soda lime glass;

(c) good stability against devitrification as illustrated by liquidi below 920° C.;

(d) essentially no deleterious effect upon the soda lime glass or adverse effect upon the surface smoothness of the soda lime glass when removed therefrom; and (e) softening points of about 575°-650° C., preferably no higher than 645° C.

The glasses have base compositions consisting essentially, expressed in terms of weight percent on the oxide basis, of 0-5% $Al_2O_3$, 35-50% BaO, 30-50% $B_2O_3$, and 5-10% $SiO_2$. Where present alone, 0.75-7.5% $Li_2O$ will be operable; where present alone, 18-27% PbO has been found to be operable. It will be appreciated, of course, that various blends of $Li_2O$ and PbO can be employed to achieve the same results; hence the expression $Li_2O$ and/or PbO. The total $Li_2O+PbO$ will not exceed about 32%, however.

The use of a minor amount of $Li_2O$ to raise the thermal expansion of a glass, while concurrently reducing the softening point thereof, was known to the art, but it was very unexpected that the large additions employed here (as much as 5 mole percent and higher) would yield glasses exhibiting sufficient stability to resist devitrification during the forming of laminated shapes with soda lime core glass.

The use of PbO supplies an added advantage over the use of $Li_2O$ in that the resulting glasses exhibit substantially lower liquidus temperatures, thereby providing more stable glasses with better forming properties.

Because of its general favorable effect in reducing the liquidus of the glasses, the preferred compositions will contain at least 0.5% $Al_2O_3$. We have also found that minor amounts of $Na_2O$ and/or $K_2O$ can be useful in modifying the properties of the glasses. The amounts thereof will be limited to no more than about 5% with a total not exceeding about 7%.

Our experimental work to date has indicated there is little, if any, composition gradient produced between the soda lime body glass and the above-described cladding glass. Thus, examination of cross sections of several laminated samples through scanning electron microscopy (SEM) has shown a very distinct separation of the two laminae, thereby indicating no extensive diffusion taking place. Also, electron spectroscopy for chemical analysis (ESCA) has detected no significant change in the surface chemistry of the body glass after removal of the skin glass.

In general, we have ascertained that forming and reforming of laminated articles are preferably undertaken at temperatures where the cladding glass has a viscosity of about $10_4-10^7$ poises and the thickness of the cladding varies between about 0.005"-0.020" ($\approx$0.125-0.51 mm). Skin thickness is important from two standpoints, cost and dimensions of the final product. It is quite apparent that the effect on cost is directly related to the amount of skin glass that is applied and then removed. The affect on product dimensions is related to the geometry of the desired final product and to the viscosity of the cladding glass. Hence, for example, where a thick fluid skin glass is used, the more irregular the shape of the product the more likely there will be a deviation from the desired design during forming. This is easily recognized in press molding a lens where, as the press platen contacts the laminate, the cladding layer is displaced and flows to the top of the cavity thereabove resulting in a lens having a truncated top. That phenomenon is minimized with a thin skin layer; thus, a cladding layer no thicker than about 0.020" ($\approx$0.51 mm) is preferred. At the other extreme, a cladding layer of only about 0.001" ($\approx$0.025 mm) in thickness may prove operable to protect the surface of the body glass from defects in certain applications. Nevertheless, a thin cladding layer having a thickness of 0.005-0.015" ($\approx$0.125-0.38 mm) has been found to be most preferred.

That the disclosed method is highly effective in protecting the surface of a soda lime core glass is illustrated by the example where, after press molding, the skin glass was measured to have an average surface roughness of about 150 microinches ($\approx$3.8 microns); whereas, after removal of the skin glass, the surface of the core glass was measured to have an average roughness below about 1.5 microinches ($\approx$0.038 micron).

PRIOR ART

U.S. Pat. No. 4,102,664 records a number of patents which are generally relevant to the present invention. The U.S. patents referred to are: U.S. Pat. No.3,023,139, 3,737,294, 3,771,983, 3,791,806, 3,849,097, 3,899,314, 3,926,601, and 3,989,495. French Patent No. 2,309,482 was also noted. However, it is believed that U.S. Pat. No. 4,102,664 is the most pertinent prior art.

DESCRIPTION OF PREFERRED EMBODIMENTS

Table I records a group of glasses illustrating the compositional parameters of the present inventive glasses. The compositions are expressed in terms of parts by weight on the oxide basis. However, because the sum of the individual components totals or very closely approximates 100, for all practical purposes the values listed in Table I may be deemed to represent weight percent. The actual batch ingredients can comprise any materials, either the oxides or other compounds, which, when melted together, will be converted into the desired oxide in the proper proportions. To illustrate, in the compositions reported, $H_3BO_3$ formed the source of $B_2O_3$ and $Li_2CO_3$ the source of $Li_2O$. $Co_3O_4$ was included in the compositions where it was desired to add color to the glass, thereby making it more readily visible.

The batch ingredients were tumble mixed together, charged into platinum crucibles, lids placed onto the crucibles, and the crucibles thereafter introduced into a furnace operating at a temperature of about 1000°-1200° C. After about one hour the resulting melt was poured into a steel mold to produce a glass slab having dimensions of about 6"×6"×0.5" ($\approx$15.25×15.25×1.25 cm), and that slab was immediately moved into an annealer.

Table I also recites determinations of softening point (S.P.) in °C., annealing point (A.P.) in °C., strain point (St.P.) in °C., coefficient of thermal expansion (Exp.) over the range of 25°-300° C. in terms of $\times 10^{-7}$/°C., and the internal liquidus temperature (Liq.) in °C., as measured in accordance with techniques conventional in the glass art. Finally, Table I reports the weight loss, expressed in terms of percent, exhibited by the glasses after immersions, with stirring, in 1N HCl after four hours at room temperature (RT) and after four hours in such a solution at 95° C.

TABLE I

| | 1 | 2 | 3 | 4 | 5 | 6 |
|---|---|---|---|---|---|---|
| $B_2O_3$ | 44.2 | 40.3 | 31.7 | 42.7 | 42.0 | 37.9 |
| $SiO_2$ | 6.54 | 7.0 | 10.9 | 8.7 | 8.6 | 7.7 |
| BaO | 49.0 | 48.4 | 55.1 | 42.8 | 42.0 | 30.4 |
| $Al_2O_3$ | — | 4.3 | 2.1 | 2.3 | 2.2 | 2.0 |
| $Na_2O$ | — | — | — | 3.5 | — | — |
| $K_2O$ | — | — | — | — | 5.2 | — |
| PbO | — | — | — | — | — | 22.1 |
| S.P. | 675 | 665 | 677 | 653 | 651 | 617 |
| A.P. | 589 | 577 | 590 | 552 | 551 | 529 |
| St.P. | 565 | 550 | 565 | 525 | 523 | 501 |
| Exp. | 66.5 | 80.9 | 85.4 | 78.0 | 87.3 | 71.9 |
| Liq. | 862 | 849 | 918 | 953 | 782 | 729 |
| RT | 44 | 66 | 59 | 41 | 55 | 26 |
| 95° C. | 100 | 100 | 81 | 100 | 100 | 86 |

| | 7 | 8 | 9 | 10 | 11 | 12 |
|---|---|---|---|---|---|---|
| $B_2O_3$ | 33.1 | 40.5 | 43.5 | 46.8 | 42.0 | 39.0 |
| $SiO_2$ | 7.4 | 9.1 | 8.9 | 9.5 | 8.0 | 8.5 |
| BaO | 36.4 | 44.6 | 43.6 | 37.5 | 46.0 | 48.6 |
| $Al_2O_3$ | 1.9 | 2.4 | 2.3 | 2.5 | 2.3 | 2.2 |
| $Li_2O$ | — | 3.5 | 1.7 | 3.7 | 1.7 | 1.6 |
| PbO | 21.2 | — | — | — | — | — |
| $Co_3O_4$ | 0.01 | — | 0.01 | — | — | — |
| S.P. | 619 | 607 | 643 | 614 | 639 | 638 |
| A.P. | 531 | 524 | 550 | 525 | 548 | 548 |
| St.P. | 505 | 499 | 524 | 502 | 524 | 524 |
| Exp. | 81.1 | 84.8 | 81.3 | 77.6 | 80.8 | 85.0 |
| Liq. | 765 | 859 | 884 | — | 839 | 916 |
| RT | 30 | 48 | 56 | 58 | 45 | 51 |
| 95° C. | 71 | 100 | 100 | 100 | 100 | 93 |

| | 13 | 14 | 15 | 16 | 17 | 18 | 19 |
|---|---|---|---|---|---|---|---|
| $B_2O_3$ | 42.8 | 42.5 | 42.3 | 43.0 | 42.8 | 45.0 | 41.8 |
| $SiO_2$ | 8.7 | 8.7 | 8.6 | 8.8 | 8.7 | 8.9 | 8.5 |
| BaO | 42.9 | 42.5 | 42.4 | 43.1 | 42.9 | 43.5 | 45.2 |
| SrO* | 0.7 | 0.7 | 0.7 | 0.7 | 0.7 | 0.7 | 0.8 |
| $Al_2O_3$ | 2.3 | 2.3 | 2.3 | 2.3 | 2.3 | — | — |
| $Li_2O$ | 1.3 | 1.0 | 0.8 | 1.3 | 1.0 | 1.7 | 0.8 |
| $Na_2O$* | 0.1 | 0.1 | 0.1 | — | — | 0.1 | 0.2 |
| $K_2O$ | 1.1 | 2.1 | 2.6 | — | — | — | 2.6 |
| $Na_2O$ | — | — | — | 0.7 | 1.4 | — | — |
| S.P. | 637 | 636 | 639 | 637 | 635 | 648 | 646 |
| A.P. | 546 | 544 | 544 | 546 | 544 | 553 | 551 |
| St.P. | 520 | 517 | 517 | 520 | 518 | 528 | 524 |
| Exp. | 77.9 | 79.1 | 79.9 | 77.9 | 78.1 | 78.2 | 83.6 |
| Liq. | 820 | 688 | 833 | 733 | 834 | 912 | 890 |
| RT | 63 | 46 | 53 | 60 | 52 | 45 | 37 |
| 90° C. | 100 | 100 | 100 | 100 | 100 | 100 | 100 |

*Impurities in the batch materials

As can be observed from the above examples, a seemingly minor variation in glass composition can result in a very significant change in the physical properties exhibited by the glass. Thus, Examples 1-5 represent compositions within the general barium borosilicate system disclosed in U.S. Pat. No. 4,102,664. Each of those glasses is too hard (the softening point thereof is too high) plus, in certain instances, the glasses lack stability and/or the thermal expansion is outside the required range. A comparison of Examples 6 and 7 is of particular interest in illustrating the extreme criticality of base glass composition in the $BaO-Al_2O_3-B_2O_3-SiO_2$ system in assuring that the desired physical properties are obtained. Examples 18 and 19 illustrate the significant effect which the presence of $Al_2O_3$ has upon the liquidus exhibited by the glasses. Also, the absence thereof appears to result in a hardening of the glass, as evidenced by a raising of the softening point. Therefore, the inclusion of $Al_2O_3$ is much preferred, as is a glass softening point below 645° C.

A batch for the glass of Example 9 was compounded, charged into a platinum crucible, and then melted according to the following procedure:
(1) Melt at 1200° C. for one hour;

(2) "Cocktail" mix (pour melt into an empty crucible and then pour back into original crucible—repeat five more times);
(3) Return to 1200° C. for 0.5 hour;
(4) Cocktail mix again;
(5) Return to 1000° C. for 0.5 hour;
(6) Cocktail mix again;
(7) Return to 1000° C. for 1.5 hours; and then
(8) Pour into steel mold to produce a glass slab measuring about 12"×4"×0.25" ($\approx$30.5×10.2×0.6 cm) and anneal.

After annealing, the slabs were cut into 4" ($\approx$10.2 cm) squares.

Because initial attempts to laminate these flat slabs with flat squares of soda lime glass resulted in considerable air entrapment at the interface between the two glass surfaces, the squares of Example 9 were sagged to a spherical shape prior to lamination. This was achieved in the following manner:

Fused silica formers were ground to a 25" ($\approx$63.5 cm) radius. A light coating of BN was sprayed onto the fused silica to serve as a parting agent. The glass squares were sagged onto the formers at a temperature slightly above the softening point of Example 9 in accordance with the following schedule:
Heat at about 250° C./hour to 650° C.;
Hold at that temperature for 20 minutes; and then
Cool at about 250° C./hour to room temperature.

Because any surface defect on the surface of the sagged square would transfer to the soda lime body glass during the fusion of the two glasses, it was absolutely necessary that the surface of the sagged square in contact with the soda lime glass be as free of defects as possible. Therefore, the sagged squares were ground and polished to further remove surface blemishes.

Commercial soda lime glass sheet prepared by the float process having a thickness of about 0.153" ($\approx$3.9 mm) was cut into 4.5" ($\approx$11.4 cm) squares and cleaned with a mild soap solution to remove any surface debris. A flat plate of fused silica was lightly sprayed with BN and then introduced into a kiln on kiln furniture to elevate it above the floor of the kiln. The square of soda lime glass was placed onto the fused silica plate in such a manner that the surface of the square that had been carried by the molten tin during the float process was in contact with the plate. The convex face of the sagged square of Example 9 was placed upon the soda lime square. A sheet metal cylinder having a height of about 8" ($\approx$20.3 cm) was positioned around that assembly and a refractory plate placed atop the cylinder. This enclosure was made to assure uniform heating during the subsequent lamination process.

The assembly was laminated into an integral unit by firing in an electrically-heated kiln in accordance with the following schedule:
The kiln was heated at about 250° C./hour to 550° C.;
That temperature was maintained for 15 minutes;
The kiln was heated at about 100° C./hour to 650° C.;
That temperature was held for 25 minutes;
The temperature was lowered to 585° C. at kiln rate;
That temperature was held for 15 minutes;
The kiln was cooled at about 25° C./hour to 350° C.; and then
The kiln was cooled at about 325° C./hour to room temperature.

As can be observed, the top temperature employed was slightly above the softening point of Example 9 (643° C.). The adhered layer of Example 9 was ground to a nominal thickness of 0.010"–0.015" ($\approx$0.25–0.38 mm). The laminated samples were reformed either by pressing or by gravity sagging.

In the following pressing experiments the laminated samples were fired in an electrically-heated kiln utilizing a cylindrically-shaped mold and plunger with a 1.875" ($\approx$4.8 cm) radius prepared from stainless steel. The mold and plunger were lightly sprayed with BN parting agent. Pressing was conducted at temperatures between 730°–800° C.; pressing pressures varied from 1–4 psi; and pressing times ranged from 5–20 seconds. A typical pressing schedule is set out below:
Heat at about 250° C./hour to 740° C.;
Maintain that temperature for 15 minutes; (The viscosity of Example 9 is about $10^5$ poises at this temperature.)
Press;
Cool at about 100° C./hour to 350° C.; and then
Cool at kiln rate to room temperature.

To remove the layer of Example 9, the samples were immersed into a 1N HCl solution at a temperature of 50° C. and the solution stirred continuously. The glass removal rate was determined to be about 0.001" ($\approx$0.025 mm)/minute. We ascertained that a 2% by weight $H_2SO_4$ solution operated in a similar manner to the HCl solution. It will be recognized that other concentrations of acid and other acids may be employed. Upon removal of the Example 9 layer, a very thin layer of silica ($\approx$300–400 Å thick) remained on the soda lime glass surface. This silica layer was readily removed by immersing the sample in a 2% by weight HF solution for about 30 seconds at room temperature. Again, it will be appreciated that other concentrations of HF solutions and other times of immersion can be utilized.

As was noted above, ESCA analysis of the surface of the soda lime glass after removal of the Example 9 glass could detect no substantial change in the surface chemistry of the soda lime glass.

The typical surface roughness of pristine soda lime float glass is about 0.12 microinch ($\approx$0.003 micron). There is some very minor surface degradation of the soda lime glass during lamination with Example 9 glass; however, the surface roughness remains below 0.5 microinch ($\approx$0.01 micron). After pressing the soda lime glass/Example 9 glass laminate and removal of the Example 9 glass and the thin silica layer, the average surface roughness is about 1 microinch or less ($\approx$0.025 micron). The surface roughness of conventionally ground and polished glassware generally resides in the vicinity of about 1 microinch ($\approx$0.025 micron). Hence, the smoothness of the soda lime glass surface after the pressing reforming is at least equivalent to that obtained through polishing.

Whereas the above procedure was carried out applying the glass of Example 9 onto the surface of the float glass square facing away from the molten tin, it will be appreciated that the procedure would also be operable where the soluble glass is applied to the surface of float glass in contact with the bath of molten tin.

Several experiments were also carried out wherein laminated samples were free sagged into molds to produce various shapes. The molds included a cylindrically-shaped stainless steel mold having a radius of 1.875" ($\approx$4.8 cm). Other molds utilized were an "S"-shaped stainless steel mold, a compound curved nickel mold, and a dish-shaped graphite mold having a diameter of 2.5" ($\approx$6.3 cm). Some samples were also sagged "flat." That process was accomplished by supporting the laminated sample at the ends thereof on 0.25" ($\approx 0.63$ cm) slivers of soda lime glass, and allowing the glass to free sag onto a flat plate of fused silica. With the exception of the graphite mold, all contact surfaces were coated with BN parting agent. In each experiment a layer of Example 9 glass contacted the mold surface with a layer of soda lime glass superposed thereon. The sagging was carried out in an electrically-heated kiln at temperatures between about 730°–800° C. according to the typical schedule set out below:

Heat at about 200° C./hour to 760° C.;
No substantive hold at that temperature;
Cool at kiln rate to 600° C.;
Cool at 100° C./hour to 400° C.; and
Cut off electric power to kiln and let cool to room temperature with samples retained therewithin.

After removal of the Example 9 glass layer through immersion in 1N HCl solution at 50° C. and removal of the thin silica layer through immersion in 2% by weight HF solution, the average surface roughness of the soda lime glass was again less than 1.5 microinches ($\approx 0.038$ micron) and, hence, at least equivalent to that obtained through polishing.

Whereas the above-described experiments involved laminating an individual, integral body of soda lime glass with a glass body of the present invention at a temperature at which at least the latter glass is in fluid form, it will be recognized that, in like manner to the disclosure of U.S. Pat. No. 4,102,664, bodies of the two glasses in the form of streams can be brought together while in the fluid state, i.e., at viscosities no higher than about $10^7$ poises, to form a laminated article. Hence, it is only necessary that the soda lime glass and a glass of the instant invention be brought into contact with each other while at least the latter glass is in the fluid state, such that a surface of the soda lime glass is covered with a glass of the present invention. Furthermore, although the above-described experiments involved contacting only one side of a soda lime glass body, it must be appreciated that, where desired, an additional side of a soda lime glass body can be contacted or the body totally enveloped within a glass of the present invention. Also, despite the fact that in the above-described experiments the entire laminate was immersed into dilute aqueous acid solution, it must be realized that it is only necessary for the soluble glass of the present invention to be so contacted; the entire laminate does not need to be contacted therewith. Moreover, whereas aqueous solutions of mineral acids such as HCl, $H_2SO_4$ and $HNO_3$ comprise the preferred solvents from an economic standpoint, it can be appreciated that other solvents may be used; for example, solutions of organic acids will also be operable.

We claim:

1. A method for preparing a soda lime glass article having at least one surface which is essentially defect free and is at least equivalent in smoothness to a polished surface which comprises the steps of:
   (a) bringing into contact with each other a body of a soda lime glass and a body of a glass consisting essentially, expressed in terms of weight percent on the oxide basis, of 0.75–7.5% $Li_2O$ and/or 18–27% PbO, the total $Li_2O$+PbO not exceeding 32%, 35–50% BaO, 0–5% $Al_2O_3$, 30–50% $B_2O_3$, and 5–10% $SiO_2$, said glass having a softening point between 575°–650° C., a coefficient of thermal expansion compatible with that of soda lime glass, and being at least 100 times more soluble in a particular solvent than soda lime glass, said contact being at a temperature wherein at least said more soluble glass is in fluid form to produce a laminate having an interface between said glass bodies which is essentially defect free;
   (b) cooling said laminate; and then
   (c) contacting said laminate with an acid solution to dissolve away said more soluble glass whereby said surface of said soda lime glass from which said more soluble glass has been removed is rendered essentially defect free and is at least equivalent in smoothness to a polished surface.

2. A method according to claim 1 wherein said more soluble glass exhibits a coefficient of thermal expansion over the temperature range 25°–300° C. between about $75-95\times10^{-7}$/°C. and a softening point below 645° C.

3. A method according to claim 1 wherein said more soluble glass contains at least 0.5% $Al_2O_3$.

4. A method according to claim 1 wherein said more soluble glass also contains up to 7% total of at least one alkali metal oxide selected from the group consisting of 0–5% $Na_2O$ and 0–5% $K_2O$.

5. A method according to claim 1 wherein said more soluble glass is at a viscosity of about $10^4$–$10^8$ poises when said soda lime glass and said more soluble glass are brought into contact with each other.

6. A method according to claim 1 wherein said laminate is heated to a temperature at which said more soluble glass exhibits a viscosity between $10^4$–$10^7$ poises to form said laminate into a shape of a desired geometry prior to contacting said laminate with an acid solution.

7. A method according to claim 1 wherein said solvent is a mineral acid.

8. A method according to claim 7 wherein said mineral acid is selected from the group consisting of HCl and $H_2SO_4$.

9. A method according to claim 1 wherein said laminate consists of soda lime glass in the form of a flat sheet wherein said more soluble glass is in contact with at least one surface thereof.

10. A method according to claim 1 wherein said laminate has a shape of a desired geometry and said more soluble glass is in contact with the entire surface of said soda lime glass body.

* * * * *